United States Patent

Hipp

(10) Patent No.: US 6,747,747 B2
(45) Date of Patent: Jun. 8, 2004

(54) APPARATUS FOR DETERMINING A DISTANCE PROFILE

(75) Inventor: Johann Hipp, Hamburg (DE)

(73) Assignee: Sick AG, Waldkirch/Breisgau (DE)

(*) Notice: Subject to any disclaimer, the term of this patent is extended or adjusted under 35 U.S.C. 154(b) by 0 days.

(21) Appl. No.: 10/092,942

(22) Filed: Mar. 5, 2002

(65) Prior Publication Data

US 2002/0149760 A1 Oct. 17, 2002

(30) Foreign Application Priority Data

Mar. 5, 2001 (DE) .......................... 101 10 420

(51) Int. Cl.⁷ ................................. G01B 11/14
(52) U.S. Cl. ...................... 356/614; 356/5.01; 250/221
(58) Field of Search ............... 356/614–615, 356/622, 3–3.09, 4.06, 4.07, 5.01; 250/559.29, 559.38, 221; 340/506, 556, 557

(56) References Cited

U.S. PATENT DOCUMENTS

| | | | | |
|---|---|---|---|---|
| 4,212,534 A | * | 7/1980 | Bodlaj | 356/3.02 |
| 4,634,272 A | * | 1/1987 | Endo | 356/5 |
| 4,656,462 A | * | 4/1987 | Arali et al. | 340/556 |
| 4,742,337 A | * | 5/1988 | Haag | 340/556 |
| 4,896,343 A | * | 1/1990 | Saunders | 356/1 |
| 4,902,126 A | * | 2/1990 | Koechner | 356/5 |
| 5,048,950 A | * | 9/1991 | Metzdroff et al. | 356/5 |
| 5,291,261 A | * | 3/1994 | Dahl et al. | 356/1 |
| 5,319,201 A | | 6/1994 | Lee | |
| 5,546,188 A | | 8/1996 | Wangler et al. | |
| 5,805,468 A | * | 9/1998 | Blohbaum | 356/5 |
| 5,923,910 A | | 7/1999 | Nakahara et al. | |
| 6,100,539 A | * | 8/2000 | Blumcke et al. | 356/5.01 |
| 6,509,958 B2 | * | 1/2003 | Pierenkemper | 356/5.01 |

FOREIGN PATENT DOCUMENTS

| | | |
|---|---|---|
| DE | 3514982 C2 | 10/1985 |
| DE | 3134815 C2 | 7/1986 |
| DE | 3514982 C2 | 4/1989 |
| DE | 3915627 C2 | 8/1991 |
| DE | 3833022 C2 | 1/1992 |
| DE | 4040894 C1 | 4/1992 |
| DE | 42 15 272 * | 5/1992 |
| DE | 4124192 A1 | 1/1993 |
| DE | 4137550 A1 | 3/1993 |
| DE | 4340756 A1 | 6/1994 |
| DE | 295000873 U1 | 4/1995 |
| DE | 4411448 A1 | 10/1995 |
| DE | 19512644 A1 | 10/1996 |
| DE | 3701340 C2 | 3/1997 |
| DE | 19828000 C2 | 1/2000 |
| DE | 19936440 A1 | 3/2001 |
| EP | 0361188 A2 | 4/1990 |
| EP | 0396865 A2 | 11/1990 |
| EP | 0486430 A2 | 5/1992 |

OTHER PUBLICATIONS

McManamon, Paul F., et al.; "Optical Phased Array Technology;" *Proceedings of the IEEE*; Feb. 1996; pp. 268–298; vol. 84; No. 2; New York, US.

* cited by examiner

*Primary Examiner*—Frank G. Font
*Assistant Examiner*—Sang H. Nguyen
(74) *Attorney, Agent, or Firm*—Townsend and Townsend and Crew, LLP

(57) ABSTRACT

An apparatus for determining a distance profile has a light transmitter for transmitting pulse-like light signals in the direction of a monitored space, a light receiver for receiving light signals reflected/remitted from the monitored space and an evaluation unit for determining distance values in dependence on the light transit time between the transmission and reception of the light signals, with the light transmitter being designed for the simultaneous transmission of a plurality of light signals in the direction of a plurality of reflection/remission points disposed in the monitored space and spaced apart from one another, and with the light receiver including a plurality of photodiodes for the reception of light signals reflected/remitted by the reflection/remission points.

11 Claims, 2 Drawing Sheets

APPARATUS FOR DETERMINING A DISTANCE PROFILE

BACKGROUND OF THE INVENTION

The invention relates to an apparatus for determining a distance profile comprising a light transmitter for transmitting pulse-like light signals in the direction of a monitored space, a light receiver for receiving light signals reflected/remitted from the monitored space and an evaluation unit for determining distance values in dependence on the light transit time between the transmission and reception of the light signals.

Apparatuses of this kind are generally known in two different embodiments. In a first embodiment, a light ray which is immovable relative to the apparatus is transmitted in a constant direction by the apparatus such that the distance of objects, which are disposed along the propagation direction of the light ray, to the apparatus can be determined. In a second embodiment, the light ray is deflected over a specific angle range, for example 180° or 360°, so that the light ray is ultimately pivoted within a plane extending adjacent to the apparatus. Such an apparatus is disclosed, for example, in German patent DE 43 40 756 C2. With this apparatus, the distance of objects can accordingly be determined which are disposed at any desired location within the plane scanned by the light ray. Exact position determinations of objects or contour measurements are likewise possible, for example, if the associated deflection angle of the light ray is also determined in addition to the distance value since conclusions can be drawn on the position of the point of reflection/remission from the distance and angle information.

The disadvantages of the apparatuses described consist of the fact that in each case only a limited region can be monitored. In the first embodiment (unmoved light ray) only objects can actually be detected which are disposed along a straight line which is static relative to the apparatus. In the second embodiment (pivoted light ray of "scanner"), only objects inside the plane in which the light ray is pivoted can be detected, but not objects which are disposed outside this plane. If a plurality of scanners are arranged above one another with a plurality of pivot planes disposed above one another, only incomplete images with gaps can again be detected since only individual lines of an image, but not the gaps between the lines, can be scanned.

SUMMARY OF THE INVENTION

An object of the invention consequently consists of improving apparatuses of the kind initially named in that larger monitored spaces can be detected, with this goal also being achievable in particular with a justifiable economic effort.

The object is satisfied in that the light transmitter is designed for the simultaneous transmission of a plurality of light signals in the direction of a plurality of reflection/remission points disposed, spaced apart from one another, in the monitored space and in that the light receiver includes a plurality of photodiodes for the reception of light signals reflected/remitted by the reflection/remission points.

In accordance with the invention, it is therefore no longer only one transmitter which interacts with a receiver, but a plurality of light signals are simultaneously transmitted in different directions, with a separate photodiode being associated with each light signal for the reception of the reflected/remitted light signal. In this way, a series of advantages can be realized:

Due to the simultaneous transmission of a plurality of light rays in different directions, a larger region, namely the region covered by the totality of the simultaneously emitted light rays, can be monitored than with the transmission of an individual light ray which only allows the monitoring of a line extending along this one light ray.

Since the light rays are transmitted simultaneously, a time saving results relative to a sequential transmission of light rays such as is usual with apparatuses in accordance with the prior art.

Since the point in time for the transmission of all light rays is the same and since a separate photodiode is associated with each light ray, the distance values associated with each light ray can be determined simultaneously since the respective time periods required for this between the transmission and the reception of the light rays are available substantially simultaneously for all light rays.

It is preferred if the plurality of transmitted light signals are components of a fan-shaped bundle of rays. It is sufficient in this case to provide a single light source which emits pulse-like light signals which are sequential in time and which are then fanned out so that a single light pulse of the light source is ultimately broken down into a plurality of simultaneously transmitted light signals. However, a plurality of light signals can likewise also be used for the production of the light bundle.

The fan-shaped light bundle can preferably extend inside one plane. However, it is alternatively also possible for the individual light rays of the light bundle to extend in different planes.

The light transmitter provided in accordance with the invention is preferably designed for the projection of a line of light, in particular a straight line of light, into the monitored space. This line of light, which preferably extends perpendicular to the projection direction, can be produced, for example, by the already explained fan-shaped light bundle which, in the case of a straight line of light, must extend inside one plane.

If such a line of light is transmitted such that it does not move relative to the apparatus, ultimately the same function can essentially be realized as with scanners known from the prior art, without moving parts having to be provided in the apparatus in accordance with the invention for the changeable deflection of a light ray. The length of the line of light or the number of the light rays forming this line of light namely define an angular range which can correspond to the deflection angular range of conventional scanners. This angular range can then be monitored in accordance with the invention while achieving the initially named advantages without a light deflection unit having to be provided in the apparatus and without it being necessary to transmit individual light rays successively in time. The whole angular range of this light bundle can rather be covered and monitored with the transmission of a single fan-shaped light bundle.

The light transmitter is preferably made as a laser diode. A plurality of laser diodes can also jointly form the light transmitter to achieve or to increase the required power.

The light receiver is preferably formed as a photodiode row, with the photodiodes extending along a straight line. This line is located, for example, inside the plane within which the fan-shaped light bundle extends.

It is particularly preferred if a light deflection apparatus is provided at the light transmitter side. It becomes possible with such a light deflection unit to deflect a fan-shaped light bundle, for example, perpendicular to that plane in which the fan-shaped light bundle extends. Accordingly, a "wandering" line of light is produced in the deflection direction which now makes it possible in comparison with scanners known from the prior art to monitor not only a plane, but also a space. In this case, it is of advantage if the light receiver is formed as a two-dimensional photodiode array.

In this embodiment with a wandering line of light, a vertically extending, straight line of light then periodically sweeps over a surface in a horizontal direction such that the whole space disposed between this surface and the apparatus can be monitored. In this connection, the line of light is transmitted at increasingly changing angles, with the distances of those points, from which the line of light is reflected/remitted back to the apparatus, to the apparatus being calculated for each angular position. With a sufficiently fast deflection speed and a sufficiently short pulse duration of the transmitted lines of light, a continuous monitoring of the space can be ensured in this manner.

The invention will be explained in the following with reference to an embodiment and to the figures.

DESCRIPTION OF THE PREFERRED EMBODIMENTS

Figure 1:
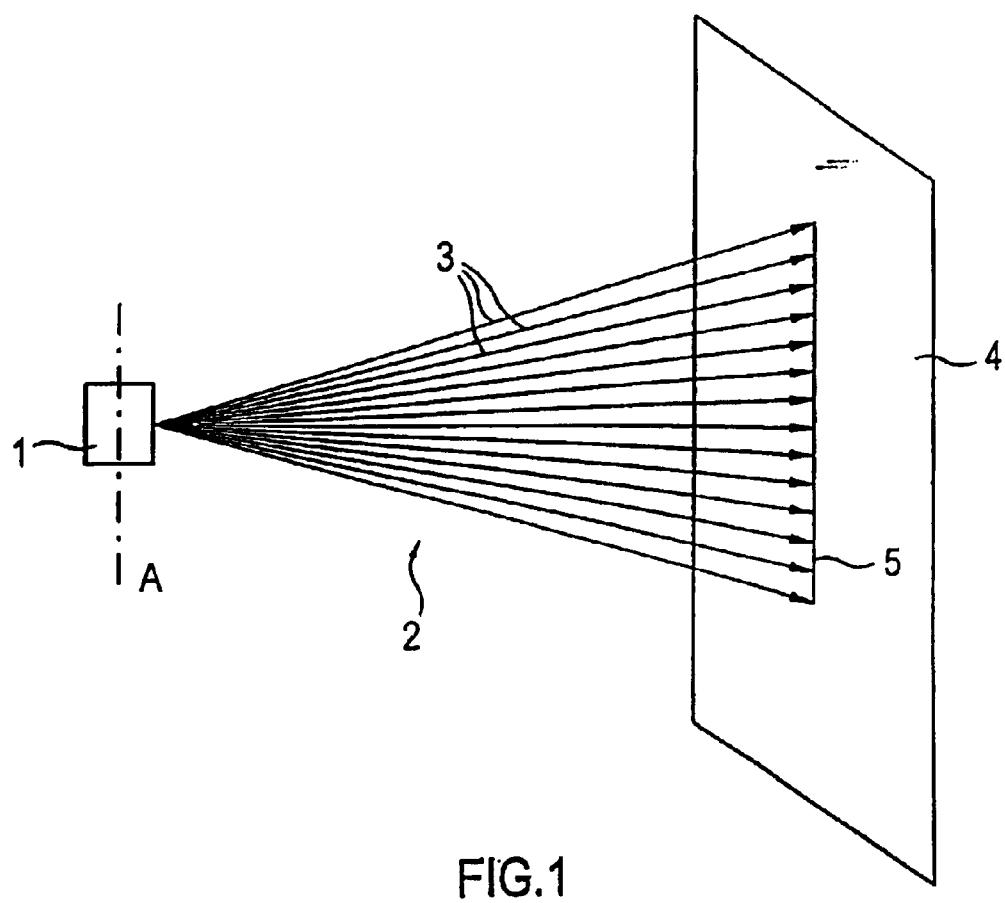
FIG. 1 is a schematic side view of an arrangement of the invention.

FIG. 1 shows an apparatus 1 in accordance with the invention which transmits a fan-shaped bundle 2 of light rays 3 extending inside a plane. The production of the light bundle 2 can take place, for example, by means of one or more lasers. When, for example, four lasers are used, a transmission lens can be interposed in front of each laser, with ultimately eight light rays 3 of the light bundle 2 being able to be transmitted by each lens so that overall a light bundle 2 consisting of 24 light rays 3 is transmitted. The number of lasers used can, however, be matched in any desired manner to the respective application; likewise the number of light rays 3 produced by a laser can be changed as required.

The light bundle 2 is transmitted in the direction of a surface 4 which extends substantially perpendicular to the propagation direction of the light bundle 2 in the example shown. The plane can, however, also extend at any desired inclination relative to the propagation direction of the light bundle 2 in other applications. A line of light 5 is produced on the surface 4 by the light bundle 2. The light transmitted by the apparatus 1 is reflected/remitted back to the apparatus 1 by this line of light 5 and the reflected/remitted light is received in the apparatus 1. The distance between the apparatus 1 and the reflection/remission point of the line of light 5 imaged on the surface 4 and associated with the respective light ray 3 can be calculated in the apparatus 1 from the time between the transmission of a light ray 3 and the reception of the reflected/remitted light associated with this light ray 3.

If an object is introduced into the space between the apparatus 1 and the surface 4, the reflection/remission in the region of this object no longer takes place at the surface 4, but at those points at which the light rays 3 are incident to the object. Accordingly, the distance of this object from the apparatus 1 or its contour can be calculated from the determined distance signals with the arrangement in accordance with FIG. 1.

Figure 2:
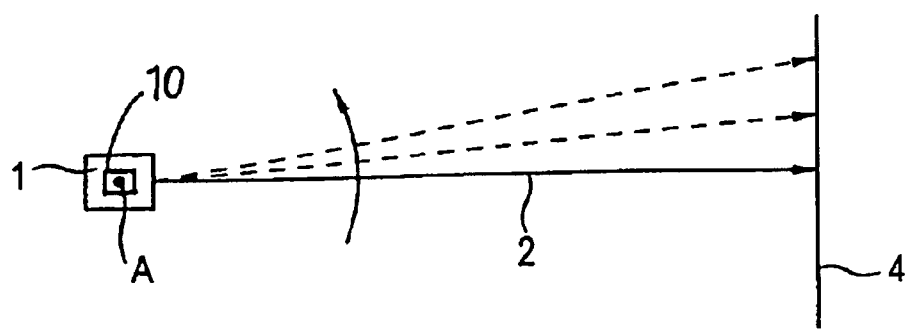
FIG. 2 is a plan view of the arrangement in accordance with FIG. 1.

A light deflection device 10 periodically pivots light bundle 2 about an axis A as is shown in FIG. 2. This pivoting has the effect that not only objects which are disposed in the region of the light bundle 2 shown in FIG. 1 can be detected by means of the arrangement in accordance with FIGS. 1 and 2. It is rather the case that all those objects can be detected which are arranged in the total pivot range of the light bundle 2. The pivot range can, for example, amount to 180°, but also 360° without problem. With a pivot movement about 160°, the whole space surrounding the apparatus 1 can be monitored.

Figure 3:
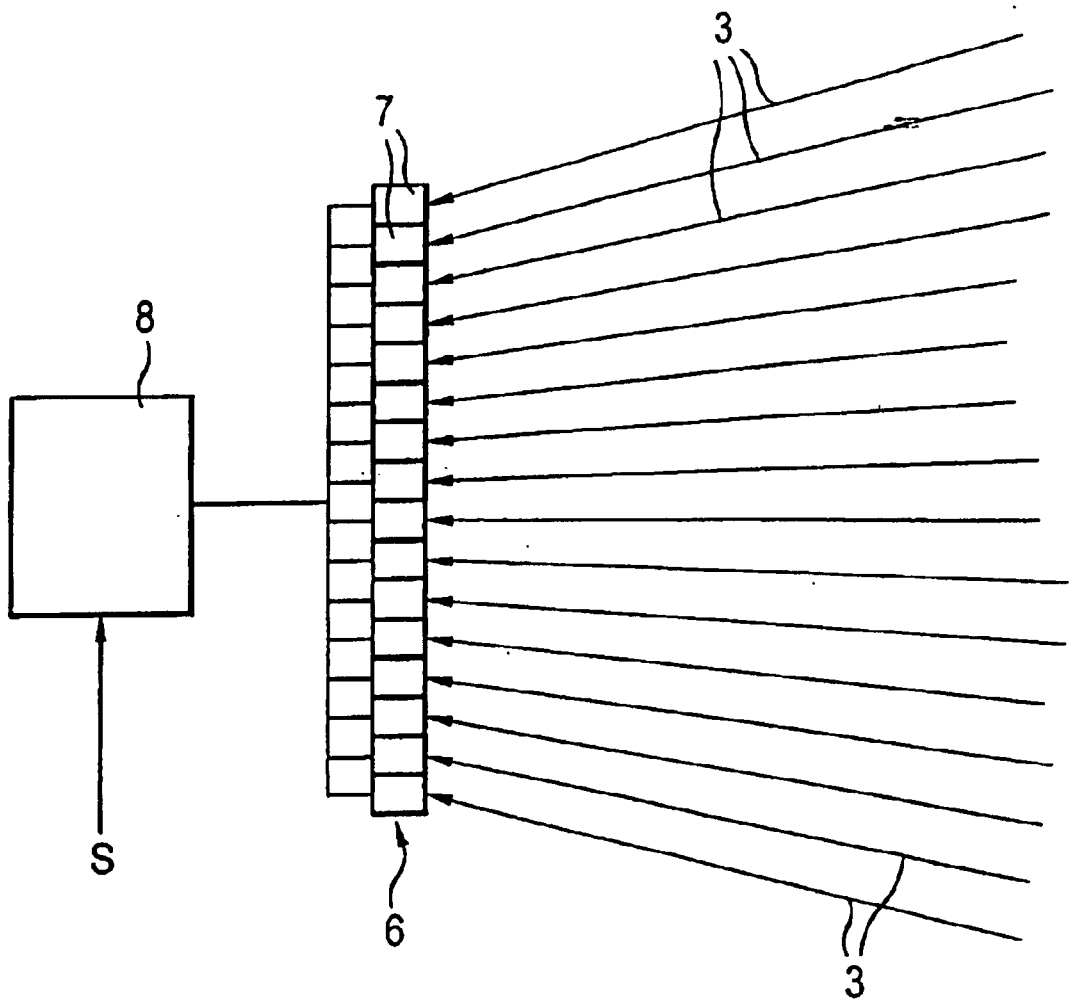
FIG. 3 is a block diagram of a light receiver, including an evaluation unit, being used in accordance with the invention.

FIG. 3 shows a light receiver 6 arranged in the apparatus 1, the light receiver consisting of a row of a plurality of photodiodes 7 arranged next to one another. Each photodiode 7 is in this connection associated with a reflected/remitted light ray 3 so that each photodiode 7 can transmit a signal at the time of the reception of the reflected/remitted light ray associated with it which is supplied to an evaluation unit 8. The evaluation unit 8 is furthermore also supplied with a signal S which corresponds to the time of the simultaneous transmission of all light rays 3. The light transit time of each light ray 3 can be calculated in the evaluation unit 8 from this signal S and the signals made available by the photodiodes 7. Conclusions can then be drawn on the distance from the apparatus 1 of the reflection/remission point associated with the respective light ray 3 while taking the light speed into account.

Within the framework of the invention, not necessarily all light rays 3 of the light bundle 2 must be transmitted at the same time. It is rather also possible to transmit individual units of some light rays in each case in a manner offset in time, with the individual light rays 3 of these units each being transmitted simultaneously. The evaluation unit 8 must then have signals applied to it which correspond to the transmission times of the individual units of light bundles 3 to be able to ultimately determine the correct distances.

What is claimed is:

1. An apparatus for determining a distance profile comprising a light transmitter for transmitting pulse light signals in the direction of a monitored space, a light receiver for receiving light signals reflected/remitted from the monitored space and an evaluation unit for determining distance values in dependence on the light transit time between the transmission and reception of the light signals, the light transmitter simultaneously transmitting a plurality of light signals in the direction of a plurality of reflection/remission points disposed in the monitored space and spaced apart from one another, the light receiver including a plurality of photodiodes for receiving the light signals reflected/remitted by the reflection/remission points, and a light deflection device associated with the light transmitter for deflecting the pulse light signals.

2. An apparatus in accordance with claim 1 wherein the evaluation unit is designed to calculate distance values in dependence on the light transit time between the transmission of the plurality of light signals and the reception of the light signals by n photodiodes, with each distance value being associated with a photodiode.

3. An apparatus in accordance with claim 1 wherein the plurality of transmitted light signals are components of a fan-shaped light bundle.

4. An apparatus in accordance with claim 3 wherein the fan-shaped light bundle extends in one plane.

5. An apparatus in accordance with claim 1 wherein the light transmitter projects a straight line of light into the monitored space.

6. An apparatus in accordance with claim 1 wherein the light transmitter comprises a laser diode.

7. An apparatus in accordance with claim 1 wherein the light receiver comprises a row of photodiodes.

8. An apparatus in accordance with claim 1 wherein the light deflection is designed for the deflection of a fan-shaped light bundle in a direction perpendicular to a plane in which the fan-shaped light bundle extends.

9. An apparatus in accordance with claim 8 wherein the light deflection device is designed for the periodic deflection of the fan-shaped light bundle.

10. An apparatus in accordance with claim 1 wherein the light receiver comprises a two-dimensional photodiode array.

11. An apparatus for determining a distance profile of a monitored space comprising a light transmitter for transmitting pulses of a plurality of light beams in the direction of the monitored space, a light receiver for receiving light beams reflected/remitted from the monitored space and an evaluation unit for determining distance values in dependence on the light transit time between the transmission and reception of the light beams, the light transmitter simultaneously transmitting the plurality of light beams in the direction of a plurality of reflection/remission points disposed in the monitored space and spaced apart from one another, the light receiver including a plurality of photodiodes, each photodiode being associated with one of the transmitted light beams for receiving the light beams reflected/remitted by the reflection/remission points, and a light deflection device associated with the light transmitter for deflecting the pulsed light beams for monitoring the space in a relatively short time.

* * * * *